Oct. 1, 1963   J. E. DALGLEISH   3,105,522
TUBE OF UNIFORM DEPTH AND VARIABLE WIDTH
Original Filed Dec. 10, 1956
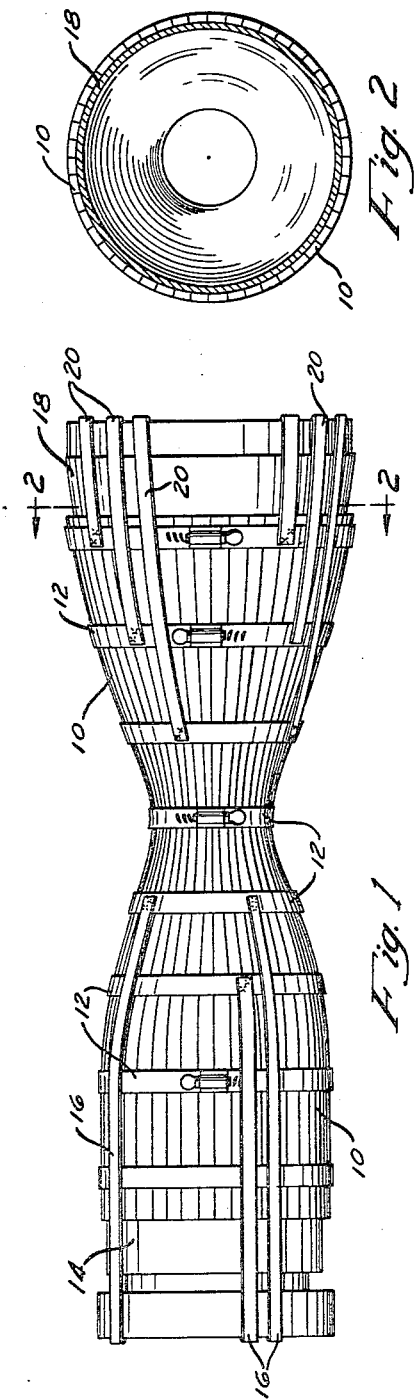
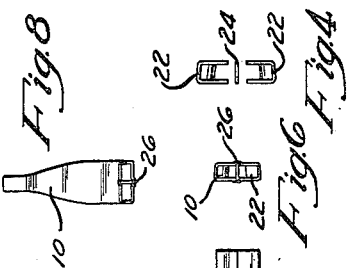
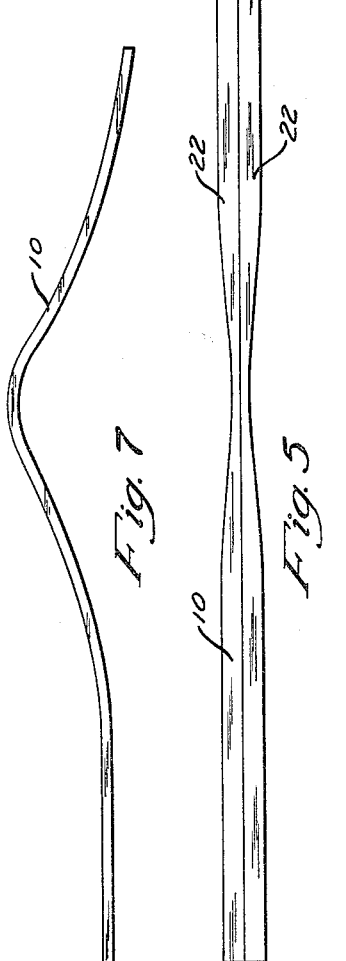
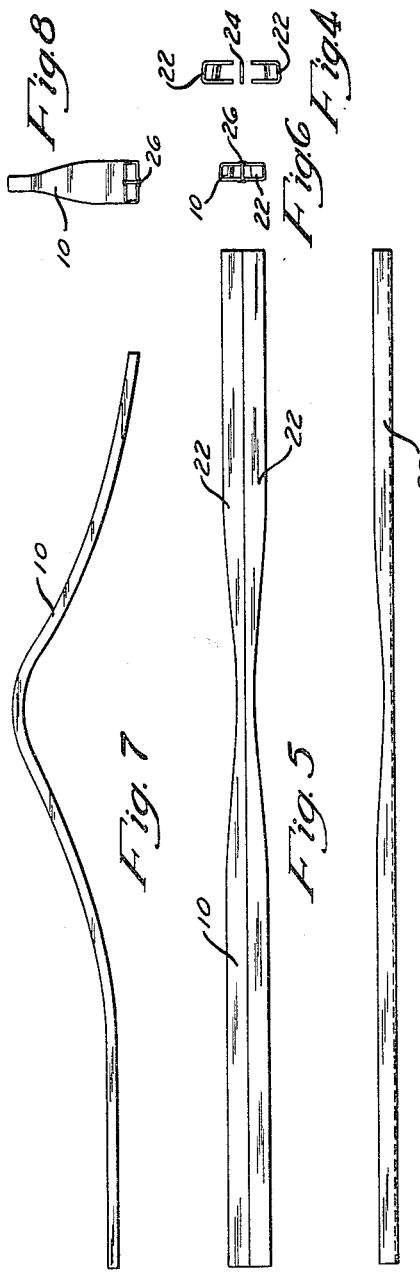
INVENTOR.
JOHN E. DALGLEISH
BY
ATTORNEYS United States Patent Office 3,105,522
Patented Oct. 1, 1963

3,105,522
TUBE OF UNIFORM DEPTH AND
VARIABLE WIDTH
John E. Dalgleish, East Detroit, Mich., assignor to
Robert C. Veit, doing business as Veet Industries, East
Detroit, Mich.
Original application Dec. 10, 1956, Ser. No. 627,215, now
Patent No. 2,976,679, dated Mar. 28, 1961. Divided
and this application Apr. 15, 1959, Ser. No. 806,553
3 Claims. (Cl. 138—115)

This invention relates to rocket combustion chambers and more particularly to tube construction which is part of the assembly that forms the chamber walls.

This application is a division of my co-pending application for tubular rocket combustion chamber Serial No. 627,215, filed December 10, 1956, now Patent No. 2,976,679.

One of the objects of this invention is to provide a tubular walled rocket combustion chamber having improved durability and reduced weight.

Another object of this invention is to provide a tubular walled rocket combustion chamber in which the wall structure has sufficient strength to retain the required fuel under high pressure for cooling the hot wall of the combustion chamber.

A still further object of the invention is to provide tubular units for assembling into a tubular walled rocket combustion chamber, the tubular units being individually fabricated in a manner which reduces cost and weight, while increasing the bursting strength thereof.

A still further object of the invention is to provide a tubular unit for assembly into a tubular walled rocket combustion chamber which is fabricated from flat sheet structure to obtain a reduced width conforming to the reduced section of the rocket combustion chamber.

Another important object of the invention is to provide a tubular unit for assembly into a tubular walled rocket combustion chamber wherein the cross-sectional area of the tubular unit is at a minimum at the reduced section of the combustion chamber to provide increased flow velocity and enhanced cooling effect in that area of the combustion chamber.

Tubular walled rocket combustion chambers have been fabricated by bundling sufficient tubes in side-by-side relationship to form a hollow wall. The tubes are utilized to conduct the rocket fuel, which operates as a coolant for the portion of the tube which is exposed to the heat of combustion within the rocket. The conventional rocket combustion chamber has a throat section intermediate the ends thereof which has a considerably reduced circumference when compared to the end sections. In order that the tubes can be assembled in abutting relation throughout their lengths, it is necessary to reduce the width thereof at the intermediate portion which is located at the throat section of the rocket chamber. In order to achieve this tube shape, tubes of uniform cross-section have been deformed in dies to produce an elongated cross-section in the direction of the circumference at the ends, and an elongated cross-section in a radial direction at the throat section of the chamber. This represents a complicated and expensive forming operation requiring several steps to accomplish. Further, a small portion of the tube area is wetted by the coolant at the throat section where the most intense heat is developed and the burn-outs usually occur.

The structure which performs the preferred embodiment of my invention utilizes a tube which is fabricated into the desired shape from flat stock. A pair of channel shaped members having varying depth of the channel along the length thereof are first formed. These channel members are then placed in abutting relationship with the open sides confronting each other. A thin web of similar material is placed between the channels and a weld is made which joins the channels and the web while sealing the joint throughout the length of the channel members. When the welding is completed, a tandem tube, having uniform height and varying width as required to fill a segment of the circumference of the combustion chamber after assembly, is produced. The web strengthens the flat walls of the tube against the bending when high internal pressures are developed therein by operating as a tension member between the flat walls of the tube.

By fabricating the tube in the manner set forth, the cross-sectional area of the flow path of the coolant is considerably reduced in the region subjected to maximum heating effects. The coolant therefore flows over the hot wall at higher velocities than has been previously obtainable with the result that the thickness of the boundary layer is reduced and the heat transfer rate considerably improved. Prolonged operation of the rocket is made possible by this feature, and the over-all durability is considerably enhanced.

The provision of the web not only increases the strength factor for resisting bursting when internal pressures are applied within the tube, but by the expedient of removing a short section of the web at one end of the tube and enclosing the tube beyond the end of the web of a U-shaped passage through the tube is obtained for regenerative cooling without making necessary the provision of additional manifolding. Both the weight and safety factors are improved since the extra piping and joints are eliminated.

Accordingly, one of the principal objects of this invention is to provide a fabrication process for forming a tubular walled rocket combustion chamber which simplifies the operations required to obtain a finished tube of the desired configuration, and improves the strength, durability, and safety factors of the finished structure.

Other objects and advantages more or less ancillary to the foregoing, and the manner in which all the various objects are realized, will appear in the following description, which considered in connection with the accompanying drawings, sets forth the preferred embodiment of the invention.

In the drawings:

FIG. 1 is an assembly view of a rocket combustion chamber utilizing the preferred embodiment of my invention;

FIG. 2 is a cross-sectional view taken along line 2—2 of FIG. 1;

FIG. 3 is a plan view of one of the parts of the tube prior to assembly;

FIG. 4 is an end view of the tube parts prior to assembly by welding;

FIG. 5 is a plan view of the assembly tube;

FIG. 6 is an end view of the tube shown in FIG. 5;

FIG. 7 is a side view of the assembled tube formed to the finished shape; and

FIG. 8 is an end view of the tube shown in FIG. 7.

Referring first to FIG. 1, the preferred embodiment of my invention is shown therein as a rocket combustion chamber in assembled form. A plurality of tubes 10 are assembled in side-by-side relationship to form an elongated double-walled tubular chamber. The internal pressure produced by the combustion of the rocket fuels is restrained by a plurality of clamps 12 circumscribing the tubes 10 and maintaining the tubes 10 in the close side-by-side position. At one end of the tubular chamber an ejector 14 is provided for discharging fuel into the combustion chamber. Details of the injector 14 are not shown and are not a part of this invention. A plurality of tension members 16 are joined at one end to the clamps 12 and at the other end to the injector 14 to hold the injector 14 in place during the combustion process.

A tail nozzle 18 is located in the discharge end of the combustion chamber and is held in position by a series of tension members 20 which are joined to the nozzle 18 and the clamps 12. The fuel system (not shown) is connected to the injector 14 which introduces the fuel by spraying the same into the portion of the combustion chamber adjacent thereto. Combustion of the fuel is instantaneous and results in an extremely high temperature gas which discharged through the throat section of the combustion chamber and expanded in the discharge nozzle at supersonic velocities at the nozzle 18.

Due to the high temperatures and turbulence within the chamber, adverse heating occurs at the combustion chamber wall which is sufficient to burn the material thereof in a short time of operation, unless provision is made to cool the wall and transfer the heat away at a rate sufficient to keep the wall from overheating. This is accomplished by the tube construction which contains the fuel prior to its passage through the injector 14. For heat transfer reasons, the inner wall or the wall exposed to the high temperature of the rocket flame should be as thin as possible to construct. On the other hand, the high fuel pressures require adequate strength to prevent bursting of the tubes due to the hydrostatic pressures in the tubes as the fuel is pumped into the injector.

The preferred embodiment of my invention includes tube structure which has the thin wall required for adequate heat transfer and has high strength characteristics for retaining the high hydrostatic pressures found in the fuel system. The tube 10 is a composite structure fabricated from weldable sheet metal having a thickness from .010 inch to 0.20 inch. A channel-shaped piece 22 is formed from the flat stock, the width of the channel being the radial width of the tube in the assembled position, and the depth of the channel being approximately one-half the circumferential width of the tube 10 in the assembled position.

Since the circumference of the combustion chamber is considerably less in the throat section than at the injector or nozzle sections, the circumferential width of the tube must be smaller proportionately if the tubes are to be assembled in uniform side-by-side position. The finished shape of a single tube is best illustrated in FIG. 5.

In order to obtain the desired shape of the tube 10 the piece 22 is formed as shown in FIG. 3 by machining away a portion of the channel intermediate the ends thereof. The shape of the channel sides and the height thereof is determined by the configuration of the combustion chamber. The height of the channel is approximately half the total width of the tube 10 throughout its length.

When the tube 10 is assembled a pair of channels 22 are disposed in a confronting relationship as shown in FIG. 4 and a strip 24 of thin material such as shim stock is placed therebetween. The strip 24 has a width slightly greater than the channel 22. The thickness of the strip 24 is in a range of .005 to .010 of an inch as required to strengthen the tube to withstand pressure loads on the interior of the tube. The channels 22 are then brought into abutting relation with the strip 24 and a weld 26 is made at the joint throughout the length of the tube. Weld 26 joins the channel sections and the strip 24 in one operation to obtain a unitary fluid-tight tandem tube structure. This welding is best done with the tube in a straight condition. However, after the welding has been finished the tube may then be formed to the eventual shape of the rocket combustion chamber wall.

The uniform depth of the tube facilitates the bending at the section where the tube has the least width. If the tube were formed from tube stock having uniform cross-section, maximum depth would occur at the point of least width and forming would be difficult.

The cross-sectional area of the tube may be controlled by controlling the depth of the channel 22. This makes it possible to obtain flow velocity characteristics which are optimim for cooling at the point of worst heat conditions.

Since the joints between the sides of the tubes, when assembled in a circular pattern, are radial in each instance, provision is made to obtain complementary surface engagement of the sides of the tube. This is accomplished by inclining the web of the channel 22 at a small angle in order that the inner wall of the tube is slightly shorter than the outer wall of the tube. This results in both the inner and outer walls being smooth and without crevices which would appear if the side walls were parallel. The degree of angularity is a function of the diameter of the rocket combustion chamber and the number of tubes employed in the formation thereof.

In some operations it is desirable to utilize regenerative cooling which involves carrying the fuel from one end of the combustion chamber to the other and return. By removing a short section or perforating the strip 24 at one end of the tube and closing the tube over, a U-shaped channel extending throughout the entire length of the tube is formed. The opening through the strip 24 provides the function of external manifolding required to establish a return passage in an adjacent tube.

Having thus described my invention, what I claim and desire to be secured by Letters Patent is:

1. A tube having a uniform depth and variable width throughout its length for use in side-by-side relationship with other similar tubes for forming a double-curved hollow wall comprising a pair of confronting channel sections having a uniform depth throughout the length thereof, said channel sections having a variable width throughout the length thereof, one side of said channel being wider at any transverse plane than the other side of the channel, and a relatively thin strip of metal lying between said confronting channels, said strip having a thickness approximately half the thickness of the channel and being of uniform width, said strip being fused at the common engagement line between said channel and said strip to provide a fluid-tight joinder of the confronting channels and said strip.

2. A tube having a uniform depth and variable width throughout its length for use in side-by-side relationship with other similar tubes for forming a double-curved hollow wall comprising a pair of confronting channel sections having a uniform depth throughout the length thereof, said channel sections having a variable width throughout the length thereof, and a relatively thin strip of metal lying between said confronting channels, said strip having a thickness approximately half the thickness of the channel and being of uniform width, the width of said strip being greater than the depth of the channel for providing a margin extending beyond the sides of said channel, said strip being fused at the common engagement line between said channel and said strip to provide a fluid-tight joinder of the confronting channels and said strip.

3. A tube having a uniform depth and variable width throughout its length for use in side-by-side relationship with other similar tubes for forming a double-curved hollow wall comprising a pair of confronting channel sections having a uniform depth throughout the length thereof, said channel sections having a variable width throughout the length thereof, one side of said channel being wider at any transverse plane than the other side of the channel, and a relatively thin strip of metal lying between said confronting channels, said strip having a thickness approximately half the thickness of the channel and being of uniform width, the width of said strip being greater than the depth of the channel for providing a margin extending beyond the sides of said channel, said strip being fused at the common engagement line between said channel and said strip to provide a fluid-tight joinder of the confronting channels and said strip.

References Cited in the file of this patent

UNITED STATES PATENTS

| | | |
|---|---|---|
| 388,824 | Callan | Sept. 4, 1888 |
| 1,500,456 | Junkers | July 8, 1924 |
| 1,622,664 | Murray et al. | Mar. 29, 1927 |
| 1,900,836 | Merritt | Mar. 7, 1933 |
| 1,935,659 | Noack | Nov. 21, 1933 |
| 1,979,804 | Lutz | Nov. 6, 1934 |
| 2,216,227 | Christenson | Oct. 1, 1940 |
| 2,794,319 | Stockdale | June 4, 1957 |
| 2,880,577 | Halford et al. | Apr. 7, 1959 |
| 2,943,442 | Baehr | July 5, 1960 |
| 2,958,183 | Singelmann | Nov. 1, 1960 |
| 2,968,918 | Denison | Jan. 24, 1961 |